(12) United States Patent
Chen et al.

(10) Patent No.: US 9,053,663 B1
(45) Date of Patent: Jun. 9, 2015

(54) ARRAY SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventors: Cheng-hung Chen, Guangdong (CN); Zuomin Liao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/233,381

(22) PCT Filed: Oct. 23, 2013

(86) PCT No.: PCT/CN2013/085780
§ 371 (c)(1),
(2) Date: Jan. 16, 2014

(87) PCT Pub. No.: WO2015/043036
PCT Pub. Date: Apr. 2, 2015

(51) Int. Cl.
*G09G 3/36* (2006.01)
*G09G 3/20* (2006.01)

(52) U.S. Cl.
CPC ........... *G09G 3/2003* (2013.01); *G09G 3/36* (2013.01); *G09G 2300/0495* (2013.01); *G09G 2300/0452* (2013.01); *G09G 2320/0242* (2013.01)

(58) Field of Classification Search
USPC .................. 345/88, 87, 89, 90, 690
See application file for complete search history.

(56) References Cited

U.S. PATENT DOCUMENTS

| | | | |
|---|---|---|---|
| 6,317,111 B1 * | 11/2001 | Nito et al. ............... | 345/88 |
| 7,505,018 B2 * | 3/2009 | Feng et al. .............. | 345/89 |
| 7,688,294 B2 * | 3/2010 | Baik ....................... | 345/88 |
| 7,916,108 B2 * | 3/2011 | Yang et al. .............. | 345/89 |
| 8,013,819 B2 * | 9/2011 | Ben-Shalom et al. ... | 345/87 |
| 8,487,851 B2 * | 7/2013 | Kim ........................ | 345/89 |
| 8,502,762 B2 * | 8/2013 | Kamada et al. ......... | 345/88 |
| 2008/0180617 A1 * | 7/2008 | Wu et al. ................ | 349/114 |
| 2013/0082913 A1 * | 4/2013 | Chen et al. .............. | 345/88 |
| 2013/0120469 A1 * | 5/2013 | Tien et al. ............... | 345/690 |
| 2014/0184661 A1 * | 7/2014 | Tsuda .................... | 345/690 |
| 2014/0240367 A1 * | 8/2014 | Kim et al. ............... | 345/690 |

* cited by examiner

Primary Examiner — Fred Tzeng
(74) Attorney, Agent, or Firm — Andrew C. Cheng

(57) ABSTRACT

The present invention discloses an array substrate and a liquid crystal display panel. In the array substrate, each pixel unit has a first pixel area, a second pixel area, and a third pixel area. The voltage applied at the first pixel area is Va. The voltage applied at the second pixel area is Vb, and the voltage applied at the third pixel area is Vc, and the relationship among the voltages is Va>Vb>Vc. Ranges of area ratios of the first pixel area, the second pixel area and the third pixel area to the pixel unit are respectively 5%-25%, 20%-45% and 35%-75%. Therefore, it can reduce the color difference at the large viewing angle to obtain a better low color shift effect and improve the display quality.

18 Claims, 1 Drawing Sheet

ARRAY SUBSTRATE AND LIQUID CRYSTAL DISPLAY PANEL

BACKGROUND OF THE INVENTION

1. Field of the Invention

The present invention relates to the field of liquid crystal display technology, and more particularly to an array substrate and a liquid crystal display panel.

2. Description of Related Art

Compared to the traditional CRT monitor, liquid crystal display (LCD) device has advantages of slim, compact, low power consumption, lifelike images, no flicker such that it gradually becomes the main development direction of the display market. The LCD device mainly utilizes the electro-optical effect of the liquid crystal by applying a voltage to control the tilt angle of the liquid crystal molecules. Therefore, the light emitted from the backlight source can pass through or not pass through the liquid crystal layer to achieve a selective light or dark effect so as to generate different colors and pictures to achieve the purpose of the display image.

However, the LCD device exist the color shift problem. Because the LCD device utilizes the liquid crystal to achieve the display, under different viewing angles, the effective refractive index of the liquid crystal molecules are not the same so as to cause the change of the light intensity of the transmitted light. Specific phenomenon is a reduced ability to transmit the light under oblique viewing angles. The display colors at the positive viewing angle and at oblique viewing angle are inconsistent, that is, the image which is observed normally at the positive viewing angle become abnormal at the oblique angle and it exist the color shift.

SUMMARY OF THE INVENTION

The main object of the present invention is to provide an array substrate and a liquid crystal display panel in order to effectively reduce the color difference at large viewing angle and improve display quality.

In order to solve the above technical problems, a technical solution provided by the present invention is: an array substrate comprising: multiple first scan lines; multiple second scan lines; multiple third scan lines; multiple data lines; and multiple pixels units, each pixel unit corresponding to one of the first scan lines, one of the second scan lines, one of the third scan lines, and one of the data lines; each pixel unit including a first pixel area, a second pixel area, and a third pixel area; each pixel unit is a R pixel unit, a G pixel unit or a B pixel unit; wherein voltages applied at the first pixel area, the second pixel area, and the third pixel area are respectively Va, Vb, and Vc; the first pixel area includes a first switch and a first pixel electrode, the second pixel area includes a second switch and a second pixel electrode, and the third pixel area includes a third switch and a third pixel electrode; the first pixel electrode connects to the first scan line and the data line of the corresponding pixel unit through the first switch, the second pixel electrode connects to the second scan line and the data line of the corresponding pixel unit through the second switch, and the third pixel electrode connects to the third scan line and the data line of the corresponding pixel unit through the third switch;

when the first scan line inputs a scan signal to control the first switch to turn on, the data line inputs the voltage Va to the first pixel electrode through the first switch, when the second scan line inputs a scan signal to control the second switch to turn on, the data line inputs the voltage Vb to the second pixel electrode through the second switch, and when the third scan line inputs a scan signal to control the third switch to turn on, the data line inputs the voltage Vc to the third pixel electrode through the third switch;

the voltage Va, Vb, and Vc have the following relationship: Va>Vb>Vc, wherein, ranges of area ratios of the first pixel area, the second pixel area and the third pixel area to the pixel unit are respectively 5%-25%, 20%-45% and 35%-75%.

Wherein, a range of the area ratio of the first pixel area to the pixel unit is 7%-15%, a range of the area ratio of the second pixel area to the pixel unit is 23%-30%, and a range of the area ratio of the third pixel area to the pixel unit is 60%-70%.

Wherein, a range of the area ratio of the first pixel area to the pixel unit is 17%-22%, a range of the area ratio of the second pixel area to the pixel unit is 33%-40%, and a range of the area ratio of the third pixel area to the pixel unit is 40%-50%.

Wherein, a range of the area ratio of the first pixel area to the pixel unit is 10%-20% a range of the area ratio of the second pixel area to the pixel unit is 25%-40%, and a range of the area ratio of the third pixel area to the pixel unit is 45%-65%.

Wherein, the multiple first scan lines, the multiple second scan lines, and the multiple third scan lines are arranged in rows, and the multiple data lines are arranged in columns; the first pixel electrode, the second pixel electrode, and the third pixel electrode are arranged in a column direction.

Wherein, the first switch is a first thin film transistor, and the first pixel electrode connects to the first scan line and the data line of the corresponding pixel unit through the first thin film transistor; the second switch is a second thin film transistor, and the second pixel electrode connects to the second scan line and the data line of the corresponding pixel unit through the second thin film transistor; the third switch is a third thin film transistor, and the third pixel electrode connects to the third scan line and the data line of the corresponding pixel unit through the third thin film transistor.

In order to solve the above technical problems, another technical solution provided by the present invention is: an array substrate comprising: multiple pixels units, each pixel unit including a first pixel area, a second pixel area, and a third pixel area; wherein voltages applied at the first pixel area, the second pixel area, and the third pixel area are respectively Va, Vb, and Vc; the voltage Va, Vb, and Vc have the following relationship: Va>Vb>Vc, wherein, ranges of area ratios of the first pixel area, the second pixel area and the third pixel area to the pixel unit are respectively 5%-25%, 20%-45% and 35%-75%.

Wherein, a range of the area ratio of the first pixel area to the pixel unit is 7%-15%, a range of the area ratio of the second pixel area to the pixel unit is 23%-30%, and a range of the area ratio of the third pixel area to the pixel unit is 60%-70%.

Wherein, a range of the area ratio of the first pixel area to the pixel unit is 17%-22%, a range of the area ratio of the second pixel area to the pixel unit is 33%-40%, and a range of the area ratio of the third pixel area to the pixel unit is 40%-50%.

Wherein, a range of the area ratio of the first pixel area to the pixel unit is 10%-20%, a range of the area ratio of the second pixel area to the pixel unit is 25%-40%, and a range of the area ratio of the third pixel area to the pixel unit is 45%-65%.

Wherein, each pixel unit is an R pixel unit, a G pixel unit or a B pixel unit.

Wherein, the array substrate further comprises multiple first scan lines, multiple second scan lines, multiple third scan lines, and multiple data lines; each pixel unit corresponds to one of the first scan lines, one of the second scan lines, one of the third scan lines, and one of the data lines; the first pixel area includes a first switch and a first pixel electrode, the second pixel area includes a second switch and a second pixel electrode, and the third pixel area includes a third switch and a third pixel electrode; the first pixel electrode connects to the first scan line and the data line of the corresponding pixel unit through the first switch, the second pixel electrode connects to the second scan line and the data line of the corresponding pixel unit through the second switch, and the third pixel electrode connects to the third scan line and the data line of the corresponding pixel unit through the third switch; when the first scan line inputs a scan signal to control the first switch to turn on, the data line inputs the voltage Va to the first pixel electrode through the first switch, when the second scan line inputs a scan signal to control the second switch to turn on, the data line inputs the voltage Vb to the second pixel electrode through the second switch, and when the third scan line inputs a scan signal to control the third switch to turn on, the data line inputs the voltage Vc to the third pixel electrode through the third switch.

Wherein, the multiple first scan lines, the multiple second scan lines, and the multiple third scan lines are arranged in rows, and the multiple data lines are arranged in columns; the first pixel electrode, the second pixel electrode, and the third pixel electrode are arranged in a column direction.

Wherein, the first switch is a first thin film transistor, and the first pixel electrode connects to the first scan line and the data line of the corresponding pixel unit through the first thin film transistor; the second switch is a second thin film transistor, and the second pixel electrode connects to the second scan line and the data line of the corresponding pixel unit through the second thin film transistor; the third switch is a third thin film transistor, and the third pixel electrode connects to the third scan line and the data line of the corresponding pixel unit through the third thin film transistor.

In order to solve the above technical problems, another technical solution provided by the present invention is: a liquid crystal display panel comprising: an array substrate; a color filter substrate; and a liquid crystal layer located between the array substrate and the color filter substrate; wherein, the array substrate comprises multiple pixels units, each pixel unit including a first pixel area, a second pixel area, and a third pixel area; wherein voltages applied at the first pixel area, the second pixel area, and the third pixel area are respectively Va, Vb, and Vc; the voltage Va, Vb, and Vc have the following relationship: Va>Vb>Vc, wherein, ranges of area ratios of the first pixel area, the second pixel area and the third pixel area to the pixel unit are respectively 5%-25%, 20%-45% and 35%-75%

Wherein, a range of the area ratio of the first pixel area to the pixel unit is 7%-15%, a range of the area ratio of the second pixel area to the pixel unit is 23%-30%, and a range of the area ratio of the third pixel area to the pixel unit is 60%-70%.

Wherein, a range of the area ratio of the first pixel area to the pixel unit is 17%-22%, a range of the area ratio of the second pixel area to the pixel unit is 33%-40%, and a range of the area ratio of the third pixel area to the pixel unit is 40%-50%.

Wherein, a range of the area ratio of the first pixel area to the pixel unit is 10%-20%, a range of the area ratio of the second pixel area to the pixel unit is 25%-40%, and a range of the area ratio of the third pixel area to the pixel unit is 45%-65%.

The beneficial effects of the present invention are: comparing with the prior art, in an array substrate of the present invention, each pixel unit has a first pixel area, a second pixel area, and a third pixel area. The voltage applied at the first pixel area is Va. The voltage applied at the second pixel area is Vb, and the voltage applied at the third pixel area is Vc such that Va>Vb>Vc. Ranges of area ratios of the first pixel area, the second pixel area and the third pixel area to the pixel unit are respectively 5%-25%, 20%-45% and 35%-75%. Therefore, it can reduce the color difference at the large viewing angle to obtain a better low color shift effect and improve the display quality.

DETAILED DESCRIPTION OF THE PREFERRED EMBODIMENT

The following content combines with the drawings and the embodiment for describing the present invention in detail.

Figure 1:
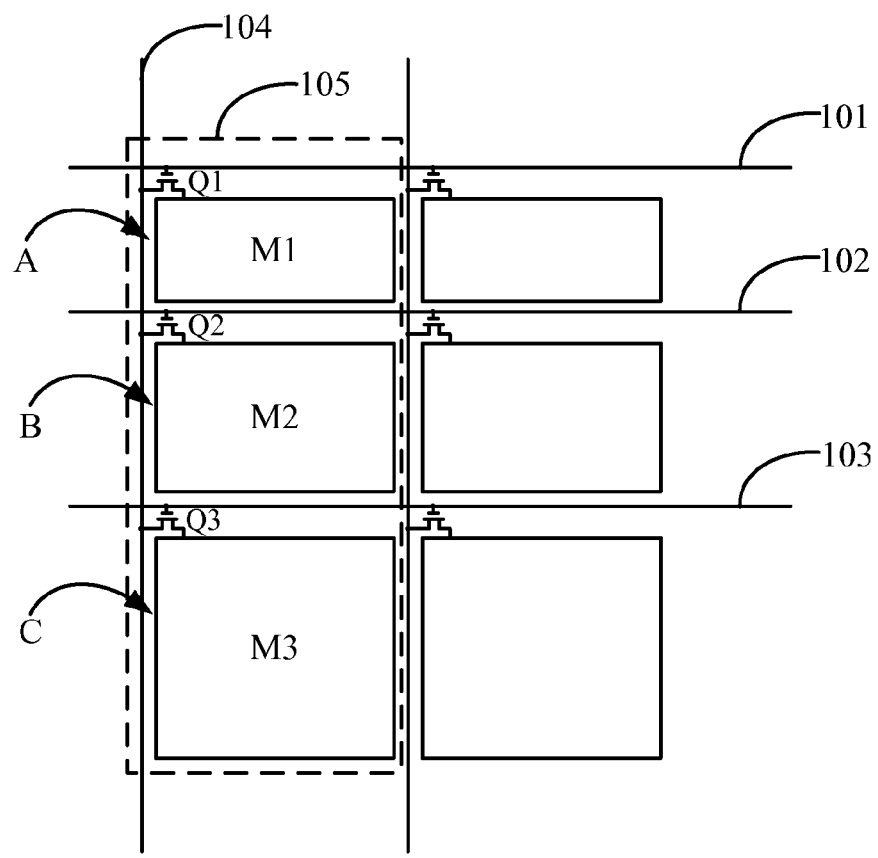
FIG. 1 is a schematic structure diagram of an array substrate according to an embodiment of the present invention.

With reference to FIG. 1, in an embodiment of an array substrate of the present invention, the array substrate comprises multiple first scan lines 101, multiple second scan lines 102, multiple third scan lines 103, multiple data lines 104 and multiple pixels units 105. Each pixel unit 105 corresponds to one of the first scan lines 101, one of the second scan lines 102, one of the third scan lines 103, and one of the data lines 104. Each pixel unit 105 is corresponding to an R pixel unit, a G pixel unit or a B pixel unit.

Each pixel unit 105 comprises a first pixel area A, a second pixel area B and a third pixel area C. Wherein, the first pixel area A includes a first switch Q1 and a first pixel electrode M1, the second pixel area B includes a second switch Q2 and a second pixel electrode M2, the third pixel area C includes a third switch Q3 and a third pixel electrode M3. Each of the first switch Q1, the second switch Q2 and the third switch Q3 includes a control terminal, an input terminal and an output terminal. The control terminal of the first switch Q1 electrically connects to the first scan line of the corresponding pixel unit 105. The input terminal of the first switch Q1 electrically connects to the data line 104 of the corresponding pixel unit 105. The output terminal of the first switch Q1 electrically connects to the first pixel electrode M of the corresponding pixel unit 105.

The control terminal of the second switch Q2 electrically connects to the second scan line 102 of the corresponding pixel unit 105. The input terminal of the second switch Q2 electrically connects to the data line 104 of the corresponding pixel unit 105. The output terminal of the second switch Q2 electrically connects to the second pixel electrode M2 of the corresponding pixel unit 105.

The control terminal of the third switch Q3 electrically connects to the third scan line 103 of the corresponding pixel unit 105. The input terminal of the third switch Q3 electrically connects to the data line 104 of the corresponding pixel unit 105. The output terminal of the third switch Q3 electrically connects to the third pixel electrode M3 of the corresponding pixel unit 105.

In the present embodiment, the first switch Q1, the second switch Q2 and the third switch Q3 are all thin film transistors, respectively, the first thin film transistor, the second thin film transistor and the third thin film transistor, wherein the control terminals of the switches correspond to the gates of the thin film transistor, the input terminals of the switches correspond to the sources of the thin film transistors, the output terminals of the switches correspond to the drains of the thin film transistor. In other embodiments, the three switches may be bipolar transistors, darlington transistors, etc., and it is not limited here.

The first scan line 101, the second scan line 102, and the third scan line 103 are arranged in rows, and the data lines 104 are arranged in columns. The first pixel area A, the second pixel area B, and the third pixel area C are sequentially arranged in a column direction, that is, the three pixel electrodes M1, M2 and M3 are sequentially arranged in the column direction. In other embodiments, the first scan line, the second scan line and the third scan line can also be arranged in columns, and the data line can also be arranged in rows, which is not limited here. Of course, the three pixel area can be arbitrarily arranged in the column direction, such as the first pixel area locating between the second pixel area and the third pixel area, or the third pixel area locating between the first pixel area and the second pixel area, which is not specifically limited.

For the first scan line 101, the second scan line 102, and the third scan line 103, it sequentially inputs a scan signal. When it inputs a scan signal for the first scan line 101 to control the first switch Q1 to turn on, the data line 104 inputs a voltage Va to the first pixel electrode M through the first switch Q1 so that the voltage of the first pixel area A is Va; When it inputs a scan signal for the second scan line 102 to control the second switch Q2 to turn on, the data line 104 inputs a voltage Vb to the second pixel electrode M2 through the second switch Q2 so that the voltage of the second pixel area B is Vb. When it inputs a scan signal for the third scan line 103 to control the third switch Q3 to turn on, the data line 104 inputs a voltage Vc to the third pixel electrode M3 through the third switch Q3 so that the voltage of the third pixel area C is Vc.

Wherein the voltages inputted at the first pixel electrode M1, the second pixel electrode M2 and the third pixel electrode M3 are different. The voltages Va, Vb and Vc have the following relationship: Va>Vb>Vc, that is, the voltages of the three pixel areas A, B and C have the relationship: Va>Vb>Vc. According to the voltage relationship among the first pixel area A, the second pixel area B, and the third pixel area C, it controls an area ratio of the area occupied by the first pixel area A, the second pixel area B, or the third pixel area C to the pixel unit 105 in order to obtain a better color shift effect. Wherein, after a large number of experiments and simulations, it can summarize that: a range of the area ratio of the first pixel area A to the pixel unit 105 is from 5% to 25%. A range of the area ratio of the second pixel area B to the pixel unit 105 is from 20% to 45%, and a range of the area ratio of the third pixel area C to the pixel unit 105 is from 35% to 75%. The total area occupied by the three pixel areas A, B and C is the area of the pixel unit 105.

Furthermore, a range of the area ratio of the first pixel area A to the pixel unit 105 is from 7% to 15%, a range of the area ratio of the second pixel area B to the pixel unit 105 is from 23% to 30%, and a range of the area ratio of the third pixel area C to the pixel unit 105 is from 60% to 70%. The total area occupied by the three pixel areas A, B and C is the area of the pixel unit 105.

For example, in this embodiment, an area ratio of the first pixel area A to the pixel unit 105 is 9%, an area ratio of the second pixel area B to the pixel unit 105 is 26%, and an area ratio of the third pixel area C to the pixel unit 105 is 65%. Of course, in other embodiments, area ratios of the first pixel area, the second pixel area and the third pixel area to the pixel unit can be 12%, 28%, 60%, or be 15%, 23%, 62%, etc. As long as they can satisfy the above conditions, it is not limited herein.

In the present embodiment, it divides the pixel unit 105 into three pixel areas A, B and C, and respectively applies the different voltages to the three pixel areas A, B and C. The voltage applied at the first pixel area A is Va. The voltage applied at the second pixel area B is Vb, and the voltage applied at the third pixel area C is Vc such that Va>Vb>Vc. According to this basis, after a large number of experiments and simulations, it can summarize that: the ranges of the area ratios of the first pixel area A, the second pixel area B and the third pixel area C to the pixel unit 105 are respectively 5%-25%, 20%-45% and 35%-75%. Therefore, it can reduce the color difference at the large viewing angle to obtain a better low color shift effect and improve the display quality.

In an alternative embodiment, under satisfying the condition of the ranges of the area ratios of the first pixel area A, the second pixel area B and the third pixel area C to the pixel unit 105 are respectively 5%-25%, 20%-45% and 35%-75% according to the present invention. Furthermore, a range of the area ratio of the first pixel area A to the pixel unit 105 can be 17%-22%, a range of the area ratio of the second pixel area B to the pixel unit 105 can be 33%-40%, and a range of the area ratio of the third pixel area C to the pixel unit 105 can be 40%-50%.

Of course in another embodiment, ranges of the area ratios of the first pixel area, the second pixel area, and the third pixel area C to the pixel unit 105 can respectively be 9%-16%, 28%-38%, and 48%-55%. It can also respectively be 10%-20%, 25%-40%, and 45%-65%.

In addition, the array substrate may use three data lines to apply corresponding voltages to three pixel areas. For example, each pixel unit corresponds to a first data line, a second data line, a third data line and a scan line. The first pixel electrode of the first pixel area connects to the first data line and the scan line through the first switch; the second pixel electrode of the second pixel area connects to the second data line and the scan line through the second switch; the third pixel electrode of the third pixel area connects to the third data line and the scan line through the third switch. When the scan line inputs a scan signal, the first data line inputs a voltage Va to the first pixel electrode, the second data line inputs a voltage Vb to the second pixel electrode, the third data line inputs a voltage Vc to the third pixel electrode, wherein the voltage Va, Vb and Vc have the following relationship: Va>Vb>Vc. In this way, it can respectively apply different voltages to the three pixel areas. Wherein the ranges of the area ratios of the first pixel area, the second pixel area and the third pixel area to the pixel unit are respectively 5%-25%, 20%-45% and 35%-75% in order to effectively reduce the color difference at large viewing angle and improve display quality.

Figure 2:
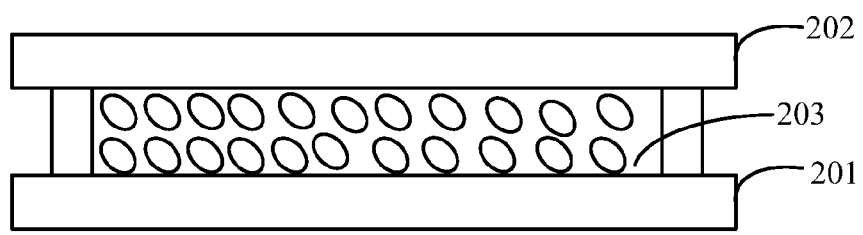
FIG. 2 is a schematic structure diagram of a liquid crystal display panel according to an embodiment of the present invention.

With reference to FIG. 2, in the liquid crystal display (LCD) panel according to an embodiment of the present invention, the LCD panel includes an array substrate 201, a color filter substrate 202 and a liquid crystal layer 203 located between the substrate 201 and the color filter substrate 202. Wherein, the array substrate 201 is one of the array substrates in the above embodiments.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An array substrate comprising:
    multiple first scan lines;
    multiple second scan lines;
    multiple third scan lines;
    multiple data lines; and
    multiple pixels units, each pixel unit corresponding to one of the first scan lines, one of the second scan lines, one of the third scan lines, and one of the data lines; each pixel unit including a first pixel area, a second pixel area and a third pixel area; each pixel unit is a R pixel unit, a G pixel unit or a B pixel unit; wherein
    voltages applied at the first pixel area, the second pixel area, and the third pixel area are respectively Va, Vb, and Vc; the first pixel area includes a first switch and a first pixel electrode, the second pixel area includes a second switch and a second pixel electrode, and the third pixel area includes a third switch and a third pixel electrode; the first pixel electrode connects to the first scan line and the data line of the corresponding pixel unit through the first switch, the second pixel electrode connects to the second scan line and the data line of the corresponding pixel unit through the second switch, and the third pixel electrode connects to the third scan line and the data line of the corresponding pixel unit through the third switch;
    when the first scan line inputs a scan signal to control the first switch to turn on, the data line inputs the voltage Va to the first pixel electrode through the first switch, when the second scan line inputs a scan signal to control the second switch to turn on, the data line inputs the voltage Vb to the second pixel electrode through the second switch, and when the third scan line inputs a scan signal to control the third switch to turn on, the data line inputs the voltage Vc to the third pixel electrode through the third switch;
    the voltage Va, Vb, and Vc have the following relationship: Va>Vb>Vc, wherein, ranges of area ratios of the first pixel area, the second pixel area and the third pixel area to the pixel unit are respectively 5%-25%, 20%-45% and 35%-75%.

2. The array substrate according to claim 1, wherein, a range of the area ratio of the first pixel area to the pixel unit is 7%-15%, a range of the area ratio of the second pixel area to the pixel unit is 23%-30%, and a range of the area ratio of the third pixel area to the pixel unit is 60%-70%.

3. The array substrate according to claim 1, wherein, a range of the area ratio of the first pixel area to the pixel unit is 17%-22%, a range of the area ratio of the second pixel area to the pixel unit is 33%-40%, and a range of the area ratio of the third pixel area to the pixel unit is 40%-50%.

4. The array substrate according to claim 1, wherein, a range of the area ratio of the first pixel area to the pixel unit is 10%-20%, a range of the area ratio of the second pixel area to the pixel unit is 25%-40%, and a range of the area ratio of the third pixel area to the pixel unit is 45%-65%.

5. The array substrate according to claim 1, wherein, the multiple first scan lines, the multiple second scan lines, and the multiple third scan lines are arranged in rows, and the multiple data lines are arranged in columns; the first pixel electrode, the second pixel electrode, and the third pixel electrode are arranged in a column direction.

6. The array substrate according to claim 1, wherein, the first switch is a first thin film transistor, and the first pixel electrode connects to the first scan line and the data line of the corresponding pixel unit through the first thin film transistor; the second switch is a second thin film transistor, and the second pixel electrode connects to the second scan line and the data line of the corresponding pixel unit through the second thin film transistor; the third switch is a third thin film transistor, and the third pixel electrode connects to the third scan line and the data line of the corresponding pixel unit through the third thin film transistor.

7. An array substrate comprising:
    multiple pixels units, each pixel unit including a first pixel area, a second pixel area, and a third pixel area; wherein
    voltages applied at the first pixel area, the second pixel area, and the third pixel area are respectively Va, Vb, and Vc; the voltage Va, Vb, and Vc have the following relationship: Va>Vb>Vc, wherein, ranges of area ratios of the first pixel area, the second pixel area and the third pixel area to the pixel unit are respectively 5%-25%, 20%-45% and 35%-75%.

8. The array substrate according to claim 7, wherein, a range of the area ratio of the first pixel area to the pixel unit is 7%-15%, a range of the area ratio of the second pixel area to the pixel unit is 23%-30%, and a range of the area ratio of the third pixel area to the pixel unit is 60%-70%.

9. The array substrate according to claim 7, wherein, a range of the area ratio of the first pixel area to the pixel unit is 17%-22%, a range of the area ratio of the second pixel area to the pixel unit is 33%-40%, and a range of the area ratio of the third pixel area to the pixel unit is 40%-50%.

10. The array substrate according to claim 7, wherein, a range of the area ratio of the first pixel area to the pixel unit is 10%-20%, a range of the area ratio of the second pixel area to the pixel unit is 25%-40%, and a range of the area ratio of the third pixel area to the pixel unit is 45%-65%.

11. The array substrate according to claim 7, wherein, each pixel unit is an R pixel unit, a G pixel unit or a B pixel unit.

12. The array substrate according to claim 7, wherein, the array substrate further comprises multiple first scan lines, multiple second scan lines, multiple third scan lines, and multiple data lines;
    each pixel unit corresponds to one of the first scan lines, one of the second scan lines, one of the third scan lines, and one of the data lines;
    the first pixel area includes a first switch and a first pixel electrode, the second pixel area includes a second switch and a second pixel electrode, and the third pixel area includes a third switch and a third pixel electrode; the first pixel electrode connects to the first scan line and the data line of the corresponding pixel unit through the first switch, the second pixel electrode connects to the second scan line and the data line of the corresponding pixel unit through the second switch, and the third pixel electrode connects to the third scan line and the data line of the corresponding pixel unit through the third switch;
    when the first scan line inputs a scan signal to control the first switch to turn on, the data line inputs the voltage Va to the first pixel electrode through the first switch, when the second scan line inputs a scan signal to control the second switch to turn on, the data line inputs the voltage Vb to the second pixel electrode through the second switch, and when the third scan line inputs a scan signal to control the third switch to turn on, the data line inputs the voltage Vc to the third pixel electrode through the third switch.

13. The array substrate according to claim 12, wherein, the multiple first scan lines, the multiple second scan lines, and the multiple third scan lines are arranged in rows, and the multiple data lines are arranged in columns; the first pixel electrode, the second pixel electrode, and the third pixel electrode are arranged in a column direction.

14. The array substrate according to claim 12, wherein, the first switch is a first thin film transistor, and the first pixel electrode connects to the first scan line and the data line of the corresponding pixel unit through the first thin film transistor; the second switch is a second thin film transistor, and the second pixel electrode connects to the second scan line and the data line of the corresponding pixel unit through the second thin film transistor; the third switch is a third thin film transistor, and the third pixel electrode connects to the third scan line and the data line of the corresponding pixel unit through the third thin film transistor.

15. A liquid crystal display panel comprising:
an array substrate;
a color filter substrate; and
a liquid crystal layer located between the array substrate and the color filter substrate; wherein,
the array substrate comprises multiple pixels units, each pixel unit including a first pixel area, a second pixel area, and a third pixel area; wherein voltages applied at the first pixel area, the second pixel area, and the third pixel area are respectively Va, Vb, and Vc; the voltage Va, Vb, and Vc have the following relationship: Va>Vb>Vc, wherein, ranges of area ratios of the first pixel area, the second pixel area and the third pixel area to the pixel unit are respectively 5%-25%, 20%-45% and 35%-75%.

16. The liquid crystal display panel according to claim 15, wherein, a range of the area ratio of the first pixel area to the pixel unit is 7%-15%, a range of the area ratio of the second pixel area to the pixel unit is 23%-30%, and a range of the area ratio of the third pixel area to the pixel unit is 60%-70%.

17. The liquid crystal display panel according to claim 15, wherein, a range of the area ratio of the first pixel area to the pixel unit is 17%-22%, a range of the area ratio of the second pixel area to the pixel unit is 33%-40%, and a range of the area ratio of the third pixel area to the pixel unit is 40%-50%.

18. The liquid crystal display panel according to claim 15, wherein, a range of the area ratio of the first pixel area to the pixel unit is 10%-20%, a range of the area ratio of the second pixel area to the pixel unit is 25%-40%, and a range of the area ratio of the third pixel area to the pixel unit is 45%-65%.

* * * * *